No. 735,429. PATENTED AUG. 4, 1903.
J. WATERS.
INSULATOR MACHINE.
APPLICATION FILED APR. 27, 1903.
NO MODEL.
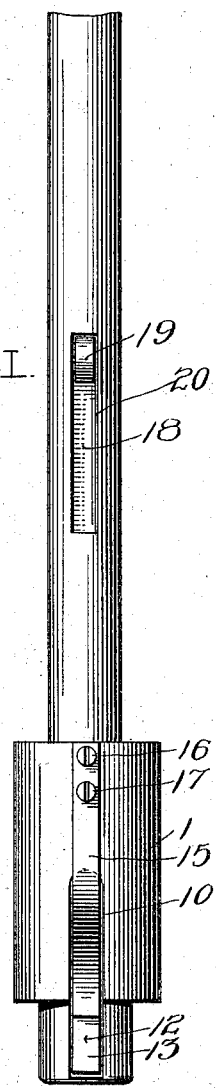
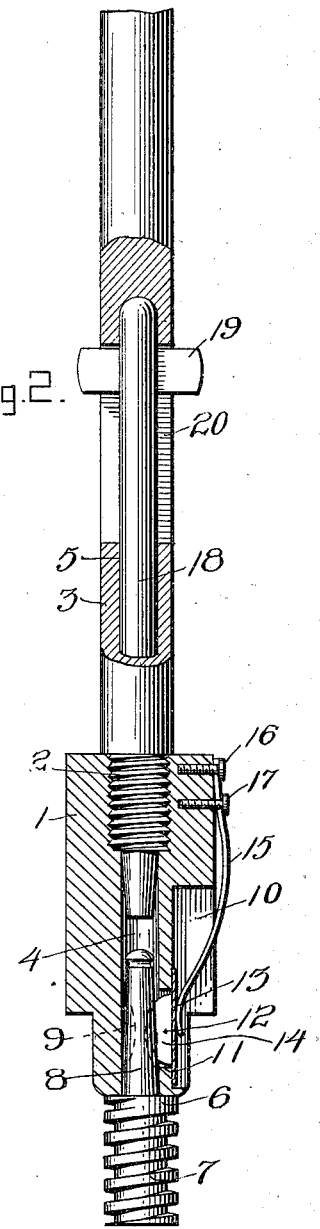
Witnesses
O. K. Reichenbach.
J. Wilson
Inventor
James Waters,
By H. B. Wilson.
Attorney No. 735,429. Patented August 4, 1903.

UNITED STATES PATENT OFFICE.

JAMES WATERS, OF PLEASANT CITY, OHIO.

INSULATOR-MACHINE.

SPECIFICATION forming part of Letters Patent No. 735,429, dated August 4, 1903.

Application filed April 27, 1903. Serial No. 154,550. (No model.)

*To all whom it may concern:*

Be it known that I, JAMES WATERS, a citizen of the United States, residing at Pleasant City, in the county of Guernsey and State of Ohio, have invented certain new and useful Improvements in Insulator-Machines; and I do declare the following to be a full, clear, and exact description of the invention, such as will enable others skilled in the art to which it appertains to make and use the same.

My invention relates to certain new and useful improvements in machines employed to screw out or remove the screw-threaded formers or plungers from glass insulators after they have been molded.

The object of the invention is to provide simple and efficient means for holding the screw-threaded former in the rotating head or chuck of the machine while the same is being screwed out of the insulator and at the same time permit of the quick and ready removal of the former or plunger from the head or chuck.

With these and other objects in view the invention consists of certain novel features of construction, combination, and arrangement of parts, as will be more fully described, and particularly pointed out in the appended claims.

In the drawings, Figure 1 is a side elevation of the shaft and rotating head or chuck of a screwing-out insulator-machine, showing my improvements applied thereto. Fig. 2 is a vertical sectional view showing a screw-threaded former or plunger in the chuck or revolving head.

Referring to the drawings more particularly, the numeral 1 denotes the chuck or rotating head, which has a screw-threaded engagement, as shown at 2, with the lower end of the shaft 3. Said head is preferably cylindrical and is formed with a central bore 4, which alines with the hollow portion or bore 5 in the lower end of the shaft 3.

6 denotes the screw-threaded former or plunger, which forms the internal screw-threads in the glass insulators when the same are molded. The former comprises the screw-threaded portion 7 and the tang 8, which is adapted to enter the bore 4 in the head 1. Said tang is formed upon opposite sides with the grooves or recesses 9.

The lower end of the head 1 is recessed, as shown at 10, and in said recess a slot 11 is formed, which communicates with the bore 4. 12 denotes a detent or locking-dog comprising the head 13, formed with a boss 14. The head 13 is adapted to seat in the recess 10 and have its boss 14 projecting through the slot 11 and seated in one of the grooves or notches 9 in the tang of the former in order to retain the same in the head or chuck. Said dog is retained in the recess 10 by the plate-spring 15, the free end of which bears against the head of said dog. The opposite end of said spring is secured upon the upper portion of the head by the screw 16, and a similar screw 17 is provided for varying the tension of the spring upon the dog.

18 denotes a knocker in the form of a reciprocating rod, which is slidably mounted in the bore of the shaft and its head. This knocker or rod is provided adjacent to its upper end with a cross-bar 19, the ends of which project through a slot 20, formed in the shaft 3. The lower end of the knocker is tapered and adapted to contact with the tang of the former in order to disengage the same from the dog 12 and to knock it out of the chuck or head.

In the operation of the device, the tang of the former is locked in the bore of the chuck or head, as shown in Fig. 2, and the latter is rotated until the threaded portion 7 of the former is screwed out of the molded insulator. The knocker 18 is then moved down to force the former out of the chuck or head.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. The combination of a former having a recessed tang, a head having a bore to receive the tang and a spring-pressed dog to engage the recess thereof and detachably receive the former to the head, a shaft, carrying the head, having a longitudinal bore and a longitudinal slot communicating therewith, the bore of the shaft being coincident with that of the head, and a knocker free to reciprocate in the bores of the head and shaft and having a cross-bar extending through and free to reciprocate in the slot of the shaft, for the purpose set forth, substantially as described.

2. The combination of a head having a longitudinal bore and an opening communicating therewith, a dog in said opening, a spring to move the dog inwardly therein, a former having a tang to enter the bore of the head and provided with a recess to receive the dog, a tubular shaft connected to the head and having a longitudinal slot communicating with its bore, and a knocker-rod loose in the bores of the tubular shaft and head and having an element extending through and free to reciprocate in the slot of the tubular shaft, substantially as described.

In testimony whereof I have hereunto set my hand in presence of two subscribing witnesses.

JAMES WATERS.

Witnesses:
  L. S. GARBER,
  JOHN SECREST.